United States Patent [19]

Jackson et al.

[11] Patent Number: 5,164,836
[45] Date of Patent: Nov. 17, 1992

[54] VISUAL EXPOSURE FEEDBACK APPARATUS FOR ELECTRONIC IMAGING SYSTEM

[75] Inventors: Todd A. Jackson, Pittsford; Y. Timothy Tsai; James E. McGarvey, both of Rochester, all of N.Y.

[73] Assignee: Eastman Kodak Company, Rochester, N.Y.

[21] Appl. No.: 729,532

[22] Filed: Jul. 15, 1991

[51] Int. Cl.⁵ .................. H04N 5/238; H04N 5/30
[52] U.S. Cl. .................. 358/228; 358/209; 354/471
[58] Field of Search .......... 358/909, 209, 228; 354/465, 471

[56] References Cited

U.S. PATENT DOCUMENTS

| | | | |
|---|---|---|---|
| 4,095,243 | 6/1978 | Numata et al. | 354/471 |
| 4,262,301 | 4/1981 | Erlichman . | |
| 4,372,657 | 2/1983 | Iwata et al. | 354/471 |
| 4,536,074 | 8/1985 | Someya et al. | 354/471 |
| 4,814,811 | 3/1989 | Saito et al. . | |
| 4,823,199 | 4/1989 | Sakakibara et al. . | |
| 4,827,347 | 5/1989 | Bell . | |
| 4,858,013 | 8/1989 | Matsuda | 358/213.17 |
| 5,041,911 | 8/1991 | Moorman | 358/909 |

FOREIGN PATENT DOCUMENTS 2076481 3/1990 Japan .

Primary Examiner—Michael Razavi
Assistant Examiner—Wendy R. Greening
Attorney, Agent, or Firm—Parkhurst, Wendel & Rossi

[57] ABSTRACT

An exposure feedback apparatus is disclosed that includes a comparison unit for receiving and comparing image data with a predetermined exposure level and generating a comparison signal indicative thereof, and a multiplexing unit responsive to the comparison signal for supplying the image data to a display output line when the image data is within a desired exposure range and for alternatingly supplying the image data and preselected display data to the output line when the image data is outside of a desired exposure range. In operation, the alternating supply of the image data and preselected display data to the display output line causes portions of a display unit coupled thereto to "blink" when areas of the imaged scene exceed the predetermined exposure level. Thus, the user is supplied with visual feedback that is indicative of the exposure conditions of the captured image.

4 Claims, 2 Drawing Sheets

VISUAL EXPOSURE FEEDBACK APPARATUS FOR ELECTRONIC IMAGING SYSTEM

FIELD OF THE INVENTION

The invention is generally related to the field of electronic imaging. More specifically, the invention is related to providing feedback to a user of an electronic imaging system to identify an exposure condition of an image to be electronically captured.

BACKGROUND OF THE INVENTION

The use of electronic cameras to capture still image data for subsequent transmission and display has become increasingly popular in applications where time is of the essence. Electronic imaging systems presently have lower resolution capabilities than conventional silver halide photographic systems, but the ability to quickly transmit and manipulate electronic image data offsets the resolution disadvantage when time is a critical factor. Many news gathering organizations, for example, now take advantage of electronic camera systems that permit a photographer to image a scene at a remote location and transmit the captured image data directly to central offices for review, editing and subsequent printing.

Electronic imaging systems, however, have another disadvantage when compared with silver halide photography systems, namely, electronic imaging systems generally have a much lower exposure latitude than conventional silver halide systems. Thus, exposure control in electronic imaging systems is of critical importance for producing acceptable images. For example, the best CCD camera images are usually obtained when the maximum exposure is employed which does not overexpose, thereby saturating the pixel elements of the CCD camera, or underexpose the objects of interest in the scene to be captured. It is possible to devise exposure control algorithms to automatically control the exposure operation in electronic imaging systems to accomplish optimum exposure control under given scene illumination conditions. A general algorithm that is capable of providing optimal exposure control for a wide variety of exposure conditions, however, is extremely difficult to generate as optimal exposure conditions are very scene dependent.

It would therefore be desirable to provide an apparatus capable of providing feedback to the user of an electronic camera system when optimal exposure conditions have been reached for any given scene. It would further be desirable to provide a "feedback" apparatus of simple and inexpensive design that could be readily incorporated into conventional electronic imaging systems.

SUMMARY OF THE INVENTION

The invention is directed to providing a feedback apparatus capable of indicating to the user of an electronic camera system when optimal exposure conditions have been reached for any given scene illumination condition. The feedback apparatus of the invention can be readily incorporated into conventional electronic imaging systems without significant modification or expense.

More specifically, in a preferred embodiment described in greater detail below, an exposure feedback apparatus is provided that includes a comparison unit for receiving and comparing image data with predetermined exposure level data and generating a comparison signal indicative thereof, and a multiplexing unit responsive to the comparison signal for supplying the image data to a display output line when the image data is within a desired exposure range and for alternatingly supplying the image data and preselected display data to the output line when the image data is outside of the desired exposure range.

In operation, the alternating supply of the image data and preselected display data to the display output line preferably causes portions of a display unit coupled thereto to "blink" when areas of the imaged scene exceed the maximum exposure level set by the user. Thus, the user is supplied with visual feedback that is indicative of the exposure conditions of the captured image. The user can then adjust exposure parameters until the area of interest in the scene stops blinking. At this point, the exposure level for the area of interest in the scene will be optimized.

BRIEF DESCRIPTION OF THE DRAWINGS

With the above as background, reference should now be made to the following detailed description of the invention and the accompanying drawings in which.

DETAILED DESCRIPTION OF THE PREFERRED EMBODIMENTS

The invention will be described with reference to its implementation in the DCS Professional Digital Camera System manufactured by the Eastman Kodak Company of Rochester, N.Y. It will be understood that the invention is not limited to the specifically described embodiment or application, but is generally applicable to any type of electronic imaging system in which exposure feedback is desired.

Figure 1:
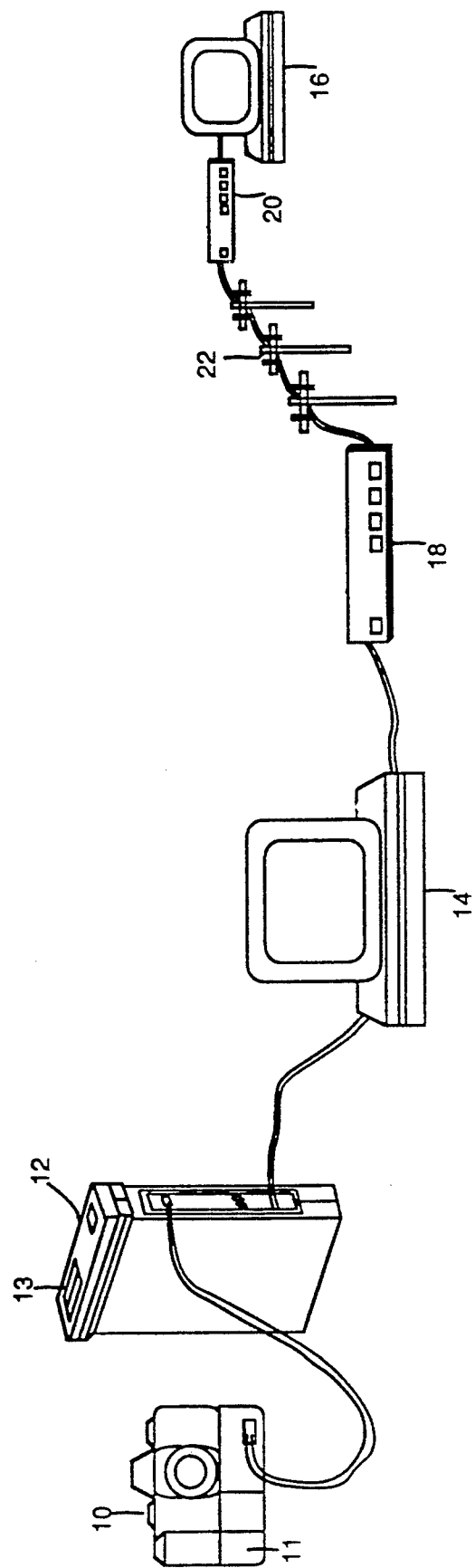
FIG. 1 is an illustration of an electronic imaging system incorporating the present invention.

Referring now to FIG. 1 an electronic imaging system for capturing and transmitting digital representations of an imaged scene is shown including a camera unit 10, a storage unit 12, a first computer 14 coupled to a second computer 16 via modems 18, 20 and a telephone transmission line 22. The illustrated system is representative of the DCS Professional Digital Camera System manufactured by the Eastman Kodak Company of Rochester, N.Y. The camera unit 10 is a conventional NIKON F-3 camera body in which the back of the camera is removed and replaced with a DM3 or DC3 KODAK Camera Back (not shown). The DM3 camera back includes a 1024×1280-pixel CCD full-frame imager with a 16×16-micrometer pixel size and is used to take monochrome images with an exposure range equivalent to ISO 400, 800, 1600, 3200. The DC3 camera back includes a built-in color filter array and is used for color images with an exposure range equivalent to ISO 200, 400, 800, 1600. A KODAK Camera Winder 11 is also coupled to the NIKON F-3 camera body. The camera unit 10 is coupled to the storage unit 12 which includes a 200 megabyte disk drive unit (not shown) that is capable of storing 158 uncompressed images or approximately 400-600 compressed images. The storage unit 12 also includes a liquid crystal display (LCD) monitor 13 that is capable of displaying monochrome representations of either color or black-and-white images captured by the camera unit 10 and is powered by an internal rechargeable battery (not shown). The camera unit 10 and the storage unit 12 constitute a portable electronic imaging system which a photographer can easily carry to remote locations.

In operation, the photographer selects desired exposure parameters such as shutter time and aperture as if conventional photographic film were being employed in the camera unit 10 and activates a shutter release button on the camera unit 10 in order to capture an image of a scene. An electronic representation of the scene being imaged is captured by the CCD imager employed by the DC3 or DM3 camera back upon activation of the shutter release button, the electronic representation of the scene is digitized, and the digitized image data is transferred to a framestore provided in the storage unit 12 for temporary storage. The image data is supplied from the framestore to the LCD monitor 13 for display, allowing the user to determine whether the desired scene was properly captured. Thus, the user is able to immediately proof the captured image to determine whether the scene was properly framed or if additional exposures are required. If the user is satisfied, the image data is transferred from the framestore to the disc drive for storage.

After a desired number of exposures are stored, the user can couple the framestore unit 12 to the first computer 14 in a local mode of operation and download the stored images from the framestore unit 12 to the first computer 14. The downloaded images may then be displayed on the first computer 14 for editing and proofing as required. Selected images can then be transmitted from the first computer 14 to the second computer 16 via the modems 18, 20 and telephone transmission line 22. The second computer 16 may be located, for example, at the publishing site of a magazine or newspaper. Thus, images captured by the photographer at a remote location can be quickly reviewed, edited and transmitted to the publication site.

In order to further reduce the delay associated with transmitting the image to the publication site, the storage unit 12 can be directly linked to the telephone transmission line 22 in a remote mode of operation to directly transmit the stored images to the second computer 16. The intermediate step of downloading the image data to the first computer 14 can therefore be avoided. It will be understood that other forms of transmission including wireless transmission, for example via a satellite link, or fiber optic cables can also be employed to transmit the selected images in place of the telephone transmission line 22 if desired.

A problem previously experienced with the above-described system was the inability of the user to determine whether areas of interest in the scene to be captured had been properly exposed. For example, in an eight bit digital system, the scene exposure level for each image pixel is represented by one of 256 digital values (0-255). Areas of the scene which are overexposed and cause saturation of the CCD imager are assigned the maximum value (255). It is extremely difficult, however, for the user to ascertain the difference between overexposed or "clipped" areas of the scene (255) from areas that are just below the point of being overexposed (for example 250-254) because of the relatively minor visual distinction between these two areas when viewed on the LCD monitor 13. Thus, the user is unable to determine whether the exposure for the particular scene has been optimized, i.e. the exposure parameters have been adjusted so that the area of interest is just below the saturation point of the CCD image pixels, by viewing the captured image on the LCD monitor 13.

Figure 2:
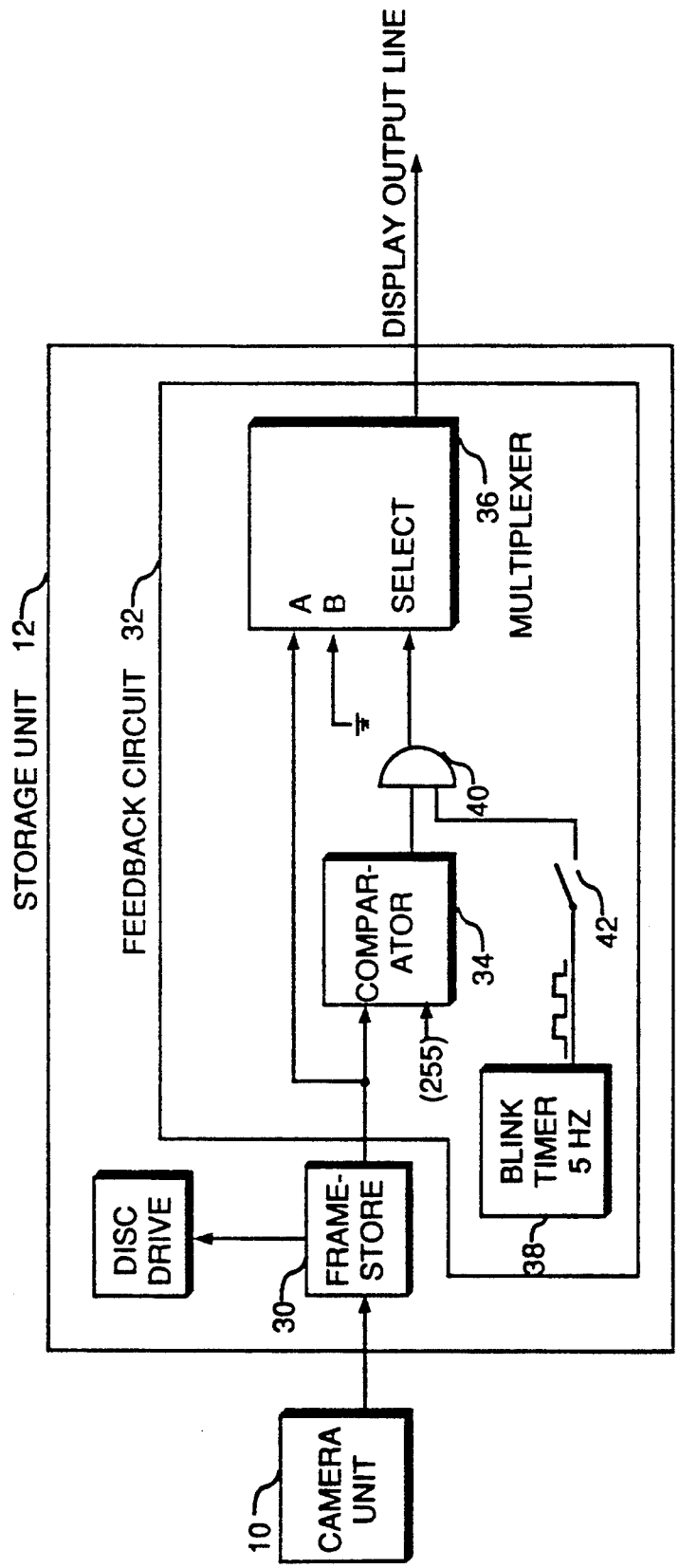
FIG. 2 is a electrical schematic block diagram of the electronic camera and framestore unit of the electronic imaging system illustrated in FIG. 1.

In order to overcome this problem, while avoiding the complexity and expense of incorporating an exposure control algorithm in the system, the invention provides visual exposure feedback to the user by preferably causing the LCD monitor 13 to flash or blink in the regions of the captured image that are overexposed. The flashing function is accomplished by incorporating an exposure feedback circuit 32 within the storage unit 12 as illustrated in FIG. 2. Digital image data is supplied from a framestore 30 of the storage unit 12 to a comparator 34 and multiplexer 36 in the feedback circuit 32. The comparator 34 compares the digital image data supplied from the framestore 30 with a predetermined maximum exposure or clipping level which would generally be the maximum value that could be assigned to the digital image data, although other values could be utilized if desired. For example, as mentioned above, the pixel image data captured by the CCD imager is assigned a digital value from 0-255 in an eight bit system. Thus, the comparator 34 would compare the digital image data supplied from the framestore 30 with the value 255 and supply a comparison signal, indicative of the result of the comparison, to a first input of an AND gate 40. The AND gate 40 also has a second input coupled to a BLINK signal line which is coupled to a blink timer 38. The output line from the AND gate 40 is coupled to the SELECT control line of the multiplexer 36. The multiplexer 36 passes the digital image data supplied from the framestore 30 to the display output line if the SELECT control line receives a logic low "0" signal, and passes a "0" (provided to a second input of the multiplexer 36) to the output line if a logic high "1" signal is supplied to the SELECT control line. Thus, the output from the multiplexer is "0" if value of the digital image data equals or exceeds the predetermined maximum exposure level and the BLINK signal is "1", otherwise the digital image data is passed to the LCD monitor 13 unaltered for display. By repeatedly passing the image data through the feedback circuit while the blink timer 38 toggles the BLINK signal between "1" and "0", those areas of the image displayed on the LCD monitor 13 that are overexposed alternate between the image data supplied from the framestore 30 and the "0" resulting in a flashing or blinking. The user, based on the visual feedback provided by the flashing or blinking, can alter the exposure parameters of the system until the area of interest stops blinking. At this point, the exposure level will be just below the predetermined maximum exposure level and the exposure of the area of interest will be optimized. A user controlled switch 42 can be utilized to deactivate the exposure feedback feature.

The said basic structure can be utilized to provide visual feedback of underexposed areas. In such a case, the comparator utilized in the feedback circuit would determine whether the value of the image data was below a predetermined minimum exposure level. The underexposed areas of the imaged scene as displayed on the LCD monitor would then flash or blink and the user would adjust the exposure parameters accordingly.

It should be understood that while the invention has been described with reference to its application in a still image system, the invention is also applicable in real-time imaging systems. For example, the digital image data may be supplied directly from the camera unit 10 to the exposure feedback circuit before display on the LCD monitor 13 without intermediate storage of the image data. The invention is also not limited to LCD display devices but can be utilized with any device, including a CRT, that is used to display electronic image data. Finally, the visual indication provided to the user can differ from the flashing or blinking described above. For example, the areas outside the predetermined exposure level (either over or under exposed) could simply be blacked out on the displayed image or made a different color if a color monitor is employed. Other modifications and variations may be made within the scope of the appended claims.

What is claimed is:

1. An exposure feedback apparatus comprising:
 a comparator for receiving and comparing image data with predetermined exposure level data corresponding to a desired exposure range and generating a comparison signal indicative of whether said image data is within or outside of said desired exposure range; and a circuit means including a logic gate having a first input coupled to an output of said comparator; a blink timer having an output coupled to a second input of said logic gate; and a multiplexer having a first input for receiving said image data, a second input for receiving preselected display data, a select control line coupled to an output of said logic gate, and an output coupled to a display output line;
 wherein said circuit means supplies said image data to said display output line when said comparison signal indicates said image data is within said desired exposure range and said circuit means supplies said image data and said preselected display data to said display output line in an alternating manner when said comparison signal indicates said image data is outside of said desired exposure range.

2. An exposure feedback apparatus as claimed in claim 1, further comprising a display unit coupled to said display output line.

3. An exposure feedback apparatus as claimed in claim 1, further comprising storage means for storing said image data and supplying said image data to said comparitor means and said circuit means.

4. An exposure feedback apparatus as claimed in claim 3, further comprising imaging means for generating said image data and supplying said image data to said storage means.

* * * * *